United States Patent [19]
Weidinger et al.

[11] Patent Number: 5,975,268
[45] Date of Patent: Nov. 2, 1999

[54] PRESSURE PLATE COMPONENT GROUP

[75] Inventors: Reinhold Weidinger, Unterspiesheim; Michael Weiss, Dittelbrunn, both of Germany

[73] Assignee: Mannesmann Sachs AG, Schweinfurt, Germany

[21] Appl. No.: 09/156,973

[22] Filed: Sep. 18, 1998

[30]     Foreign Application Priority Data

Sep. 19, 1997 [DE]  Germany ............................ 197 41 299

[51] Int. Cl.$^6$ .................................................. F16D 13/75
[52] U.S. Cl. ..................... 192/70.25; 192/111 A
[58] Field of Search .............. 192/111 A, 70.25

[56]              References Cited

U.S. PATENT DOCUMENTS

| | | | |
|---|---|---|---|
| 5,540,313 | 7/1996 | Weidinger | 192/70.25 |
| 5,560,463 | 10/1996 | Link et al. | 192/70.25 |
| 5,570,768 | 11/1996 | Uenohara et al. | 192/70.25 |
| 5,645,153 | 7/1997 | Weidinger | 192/70.25 |
| 5,715,920 | 2/1998 | Lindner et al. | 192/70.25 |
| 5,884,741 | 3/1999 | Bokisch et al. | 192/70.25 |
| 5,904,233 | 5/1999 | Hashimoto | 192/70.25 |

FOREIGN PATENT DOCUMENTS

| | | |
|---|---|---|
| 769 633 | 4/1997 | European Pat. Off. . |
| 44 14 471 | 11/1995 | Germany . |
| 2 314 893 | 1/1998 | United Kingdom . |

*Primary Examiner*—Rodney H. Bonck
*Attorney, Agent, or Firm*—Cohen, Pontani, Lieberman & Pavane

[57]              ABSTRACT

In a pressure plate component group for a motor vehicle friction clutch with automatic wear compensation, at least one clearance indicator arrangement is provided, which has a clearance indicator element supported on a carrier component of the pressure plate component group so as to be rotatable around an element rotational axis. The clearance indicator element has a wear readjustment area for interaction with a wear readjustment device. Further, the clearance indicator element has, on a circumferential surface, at least regionally, a thread-type surface formation, which engages, at least regionally, with a counter-surface formation on the pressure plate component group. Further, the clearance indicator element, with its thread-type surface formation, can be moved relative to the counter-surface formation so as to produce a relative movement between the thread-type surface formation and the counter-surface formation that differs from the relative rotational movement between the thread-type surface formation and the counter-surface formation that is produced by rotating the clearance indicator element around the element rotational axis. Further, a movement assembly is provided for producing the relative movement between the thread-type surface formation and the counter-surface formation.

22 Claims, 5 Drawing Sheets

PRESSURE PLATE COMPONENT GROUP

BACKGROUND OF THE INVENTION

1. Field of the Invention

The present invention relates to a pressure plate component group, especially for a motor vehicle friction clutch with automatic wear compensation.

2. Discussion of the Prior Art

Motor vehicle friction clutches are generally constructed in such a way that, in the engaged state, the friction linings of a clutch disk are clamped between the pressure plate of a pressure plate component group and a flywheel. The repeated disengagement and engagement procedures carried out during operation of the clutch cause the friction linings of the clutch disk to become used and worn. As a result, as the age of the clutch increases, the pressure plate, in the engaged state, comes ever closer to the flywheel. Because an energy storage device, for example, a diaphragm spring, acts between the pressure plate and a clutch housing, the increasingly close approach of the pressure plate to the flywheel in the engaged state is accompanied by a corresponding following movement of the energy storage device. This in turn means that the optimal working area once provided for the energy storage device, with respect to its force characteristic, is deviated from, so that the energy storage device can no longer perform its suitable or desired function.

To avoid this disadvantage, it is known to integrate clearance indicators and wear readjustment devices into clutches or pressure plate component groups of this type, so that the wear occurring on the friction linings of the clutch disk during clutch operation can be determined and compensated for, for example, by the axial lengthening of the wear readjustment device, in keeping with the wear that has occurred.

In particular, the provision of a clearance indicator often requires relatively expensive structures, because a way to detect the relative movement between two components that move relative to each other when wear occurs must be created. For example, a frequently used method is to provide an axially movable wear detection pin on the pressure plate. The wear detection pin extends radially outside of the clutch disk in the direction of the flywheel. When wear occurs, and the pressure plate therefore moves closer to the flywheel, the wear detection pin strikes the flywheel and thus detects the wear that has occurred. Such a structure requires that the components that perform this wear detection function be arranged radially outside of the clutch disk. This fact results in a corresponding enlargement of the overall pressure plate component group or of the motor vehicle friction clutch equipped therewith.

SUMMARY OF THE INVENTION

The object of the present invention is to provide a pressure plate component group, especially for a motor vehicle friction clutch with automatic wear compensation, which, while simply structured, can carry out a reliable automatic wear compensation function.

According to the invention this object is attained by a pressure plate component group, especially for a motor vehicle friction clutch with automatic wear compensation, comprising: a housing attachable or attached to a flywheel for common rotation around a rotational axis, a pressure plate arranged in rotation-proof fashion in the housing and axially movable relative thereto, and an energy storage device, preferably a diaphragm spring, which rests on the housing, on one hand, and on the pressure plate, on the other, and which presses the pressure plate in the direction of the side of the housing that is provided for connection to the flywheel. A wear readjustment device is arranged in the support path of the energy storage device and has at least one readjustment element that is prestressed in a wear readjustment device and can be moved for the purpose of wear readjustment. At least one clearance indicator arrangement is provided which permits, in interaction with the wear readjustment device, compensation for wear that occurs, during clutch operation, on the friction linings of a friction clutch that are clampable or clamped between the pressure plate and the flywheel.

In the pressure plate component group according to the invention, the clearance indicator arrangement, of which there is at least one, comprises a clearance indicator element that is supported on a carrier component of the pressure plate component group so as to be rotatable around an element rotational axis. The clearance indicator element has a wear readjustment area for interaction with the wear readjustment device, and is embodied, on a circumferential surface, at least regionally, with a thread-type surface formation that engages, at least regionally, with a counter-surface formation on the pressure plate component group. Further, the clearance indicator element with its thread-type surface formation can be moved relative to the counter-surface formation so as to produce a relative movement between the thread-type surface formation and the counter-surface formation that differs from the relative rotational movement between the thread-type surface formation and the counter-surface formation produced by rotating the clearance indicator element around the element rotational axis. The clearance indicator arrangement also comprises movement means to produce the relative movement between the thread-type surface formation and the counter-surface formation.

Compared with conventional pressure plate component groups, the pressure plate component group according to the invention contains relatively few components for the purpose of carrying out automatic wear compensation. The function of the pressure plate component group according to the invention is based on the realization in the present invention that the known automatic self-loosening effect of screws can be used in a defined manner for automatic wear compensation. Use is thereby made of the principle that in the case of a screw connection, e.g., between a screw and a nut, the exertion of transverse stresses on one of the parts, e.g., the screw, and the concomitant movement of the parts at right angles to each other, is accompanied by a tilting movement in the thread, which leads to a relative movement between the reciprocally supporting threads or thread surfaces of the screw, on the one hand, and the nut, on the other. This relative movement creates a slide friction state with a coefficient of friction clearly lower than that in a state of adhesive friction. This reduction in the coefficient of friction means that the coefficient of friction related to the possible relative rotation of the screw and the nut is also sharply reduced, so that, induced by the relative movement, the known automatic self-loosening occurs.

In the pressure plate component group according to the invention, it is possible, for example, for the clearance indicator element to be pressed in a first movement direction by interaction with the wear readjustment device.

To attain a relative movement between the thread-type surface formation and the counter-surface formation, it is then advantageous for the movement means to be embodied to move the clearance indicator element in a second movement direction substantially opposite to the first movement direction.

The relative movement can be produced very simply when the clearance indicator element is supported on the carrier component so as to be tiltable relative to the element rotational axis for the purpose of producing the relative movement, and the movement means comprise tilting means.

In the pressure plate component group according to the invention, it is possible, for example, for the wear readjustment area to comprise a contact projection that is embodied on the clearance indicator element and that extends substantially radially outward relative to the element rotational axis and at least partially in the circumferential direction. The wear readjustment device can act on this contact projection to move the clearance indicator element in the first movement direction, and the movement means can preferably act on the contact projection to move the clearance indicator element in the second movement direction. To produce movement in the second movement direction, it is proposed that the movement means comprise a wear detection element that can move relative to the contact projection when wear occurs.

In an especially advantageous and simply constructed embodiment, the carrier component can be stationary relative to the pressure plate. For example, the pressure plate can constitute the carrier component and can have a threaded opening that, with an internal thread, forms the counter-surface formation, while the clearance indicator element can comprise a bolt or the like equipped at least in one longitudinal area with an external thread that forms the thread-type surface formation.

Alternatively, it is also possible for a carrier bolt that forms the carrier component to be attached to the pressure plate, the carrier bolt having an external threaded area that forms the counter-surface formation, and for the clearance indicator element to be embodied in a ring-like manner with an internal thread that forms the thread-type surface formation.

In one embodiment of the pressure plate component group according to the invention, the wear detection element preferably comprises a wear detection pin that is run movably on the pressure plate and can be brought into contact, for the purpose of wear detection, with the flywheel or another component of the pressure plate component group. When wear occurs, the wear detection pin can be brought to rest, with a tilting section, on the contact projection of the clearance indicator element.

Alternatively, it is possible for the wear detection element to comprise a wear detection part, which is attached to the housing or to the energy storage device and, when wear occurs, can be brought to rest, with a movement section, on the contact projection of the clearance indicator element. In this embodiment, the provision of components extending in the axial area between the pressure plate and the flywheel, along with the resulting aforementioned disadvantages, can be avoided.

It has been found that the automatic rotational movement discussed above can be especially effectively induced when the thread-type surface formation has an approximately saw-toothed profile and the counter-surface formation has a threaded counter-surface formation with a complementary saw-toothed profile.

The pressure plate component group according to the invention can be embodied in such a way that the counter-surface formation comprises a threaded counter-surface formation provided on the carrier component, while the thread-type surface formation and the threaded counter-surface formation are adjusted to each other so as to have a tilting movement clearance relative to each other, in order to permit tilting.

The clearance indicator element can be embodied in a ring-like manner with a through opening, and can be supported on a carrier bolt that penetrates the through opening with a movement clearance that permits tilting. The carrier bolt constitutes the carrier component and is secured to the pressure plate. The thread-type surface formation, located on a radially outer area of the clearance indicator element, comprises at least one helical projection section, which extends at least partially in the circumferential direction as well as helically relative to the element rotational axis. The helical projection section, of which there is at least one, has a wear readjustment area, and is acted on by the tilting means.

Advantageously, for interaction between the wear readjustment device and the clearance indicator element, the wear readjustment device can be brought to rest on the helical projection section(s), and an area of the counter-surface formation can be embodied on the wear readjustment device.

A further area of the counter-surface formation can be embodied on the tilting means.

The tilting means can comprise, for example, a contact surface region provided on the housing. Advantageously, the clearance indicator element is embodied so that the thread-type surface formation comprises a first helical projection section for interaction with the wear readjustment device and a second helical projection section for interaction with the tilting means.

The function of the pressure plate component group according to the invention can be described as follows:

a) In an approximately wear-free state of the friction linings, the clearance indicator element is moved or pressed by the wear readjustment device in a first movement direction.

b) Upon the occurrence or detection of wear, the clearance indicator element is moved or pressed by the movement means in a second movement direction.

c) Upon a subsequent disengagement procedure, the movement action of the movement means pressing the clearance indicator element in the second movement direction is at least partially eliminated, and the clearance indicator element is moved or pressed by the wear readjustment device in the first movement direction.

d) Given further wear, or wear not yet fully compensated for, on the friction linings, upon a subsequent engagement procedure the movement means act again on the clearance indicator element and move or press this element in the second movement direction.

The alternating movement of the clearance indicator element, with the accompanying relative movement between the thread-type surface formation and the counter-surface formation, leads to a relative rotation between the thread-type surface formation and the counter-surface formation and, in keeping with the extent of this relative rotation, a wear compensation expansion of the wear readjustment device in the direction of the rotational axis is thereby permitted.

Advantageously, the relative rotational movement induced between the thread-type surface formation and the counter-surface formation then leads to an axial movement of the clearance indicator element together with the wear readjustment area that is provided thereon and that interacts with the wear readjustment device.

Alternatively, the clearance indicator element can be held in an axially immovable fashion relative to the carrier component. In this case, when relative rotation occurs between the thread-type surface formation and the counter-surface formation, successive regions of the thread-type surface formation come into interaction with the wear readjustment device, and these regions permit an axial expansion of the wear readjustment device for the purpose of compensating for the wear that has occurred.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
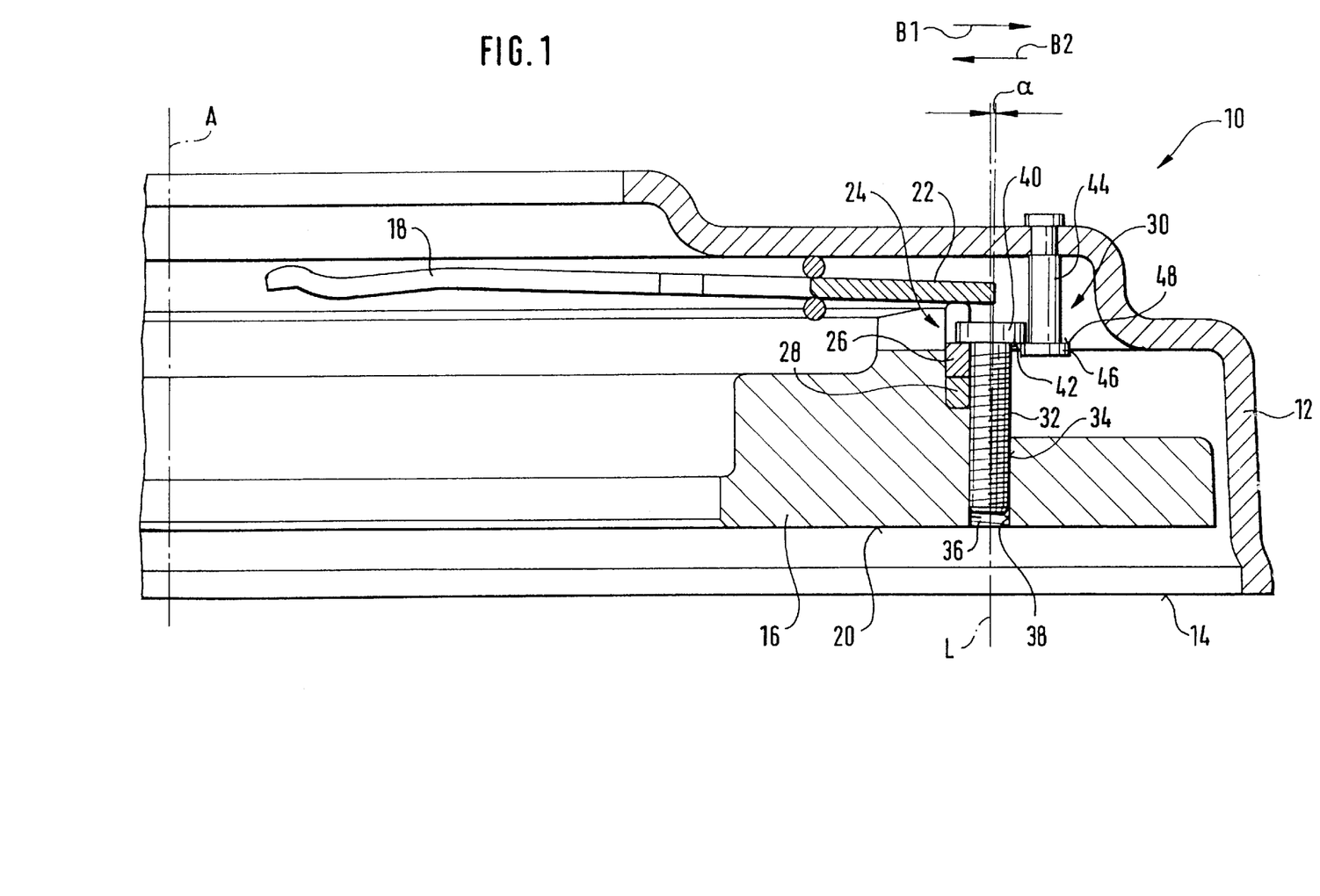
FIG. 1 is a partial longitudinal section of a pressure plate component group according to the invention.

FIG. 1 shows a partial longitudinal sectional view through a pressure plate component group 10 according to the invention. The pressure plate component group 10 comprises a housing 12, which can be connected on one side 14 to a flywheel, not shown in the drawings, for the purpose of forming a motor vehicle friction clutch. In the housing 12, in a known manner, a pressure plate 16 can be moved in the direction of a rotational axis A. However, the pressure plate 16 is held in a rotation-proof fashion relative to the housing 12, for example, via tangential leaf springs (not shown). A diaphragm spring 18, which constitutes an energy storage device, prestresses the pressure plate 16 in the direction of the flywheel (not shown). As a result, in an assembled motor vehicle friction clutch, the friction linings of a clutch disk are clamped between a friction surface 20 of the pressure plate 16 and a corresponding friction surface of the flywheel. The diaphragm spring 18 is supported in a radially central area on the housing 12, and, with its radially outer region 22, presses the pressure plate 16 via a wear readjustment device 24.

The wear readjustment device 24 comprises two readjustment rings 26, 28. One readjustment ring 28 rests on the pressure plate 16, while the other readjustment ring 26 rests on the readjustment ring 28 and is also pressed by the outer region 22 of the diaphragm spring 18. The readjustment rings 26, 28 are embodied in their area of reciprocal contact with slanted surfaces that extend in the circumferential direction. That is, the two readjustment rings 26, 28 have complementary slanted surfaces (as shown, for example, in FIG. 4), so that a relative rotation of the two readjustment rings produces, due to these slanted surfaces sliding on each other, an axial expansion of the wear readjustment device 24. Acting between the readjustment rings 26, 28 are helical tension springs (not shown in the drawings), which prestress the two wear readjustment rings 26, 28 in a readjustment direction, causing a lengthening of the wear readjustment device 24.

The pressure plate component group 10 according to the invention also provides a clearance indicator arrangement 30, which, in interaction with the wear readjustment device 24, carries out automatic compensation for wear that occurs on the friction linings of the clutch disk during clutch operation. Although several clearance indicator arrangements 30 can be distributed in the circumferential direction, one is sufficient for correct functioning. The clearance indicator arrangement 30 comprises a screw bolt 32, which constitutes a clearance indicator element. The screw bolt 32, which has an external thread 34, is screwed into an axial opening 36 with an internal thread 38 in the pressure plate 16. The dimensions of the screw bolt 32, on the one hand, and the threaded opening 36, on the other, and the dimensions of the external thread 34 and the internal thread 38, are adjusted to each other so that the screw bolt 32, in addition to its possible rotational movement relative to the pressure plate 16 when screwed in or out, can also tilt relative to a bolt longitudinal axis L in a predetermined angular area α that can lie, for example, at 2° to 4°.

The bolt 32 also has a bolt head 40 with a support surface 42, which faces the pressure plate. The screw bolt 32 is positioned relative to the wear readjustment device 24 in such a way that, regardless of the tilt position of the bolt 32 in the opening 36, a surface section of the support surface 42 always radially overlaps the readjustment ring 26, as shown in FIG. 1.

Further, a wear detection element in the form of a bolt 44 is attached to the housing 12. The bolt 44 has a bolt head 46 with a counter-support surface 48, which lies in a direction opposite to the support surface 42. The bolt 44 is positioned relative to the screw bolt 32 so that, once again, regardless of the tilt position, there is always a radial overlap between the support surface 42 and the counter-support surface 48.

The function of the pressure plate component group shown in FIG. 1, especially for implementing the automatic wear compensation, is described below.

In a normal, wear-free operating state of a motor vehicle friction clutch equipped with the pressure plate component group 10, there should be, when the clutch is in an engaged state wherein the pressure plate 16 is moved to the maximum extent toward the flywheel, a slight distance or, at the most, very slight contact between the contact surface 42 and the counter-contact surface 48. Because of the springs that act between the readjustment rings 26, 28 (which springs, in a previous, disengaged clutch state wherein the wear readjustment device 24 was not pressurized by the diaphragm spring 18, have led the wear readjustment device 24 to attempt to axially expand), the readjustment ring 26 comes to rest on the support surface 42 of the bolt head 40. The tilting moment thereby produced causes the screw bolt 32 to move or tilt in a first movement direction B1, so that, in FIG. 1, the screw bolt 32 is inclined slightly to the right. In this state, the readjustment ring 26 rests under pressure on the support surface 42. Upon a subsequent disengagement process, during which the diaphragm spring 18 releases the wear readjustment device 24, no further axial expansion of the wear readjustment device 24 is possible, because the wear readjustment device 24 strikes the support surface 42 of the screw bolt 32 and, as a result, the rings 26, 28 are prevented from further rotation relative to each other.

Should wear now occur on the friction linings during operation of the clutch, the pressure plate 16, in the engaged state, will move ever closer to the flywheel. When a certain degree of wear is reached or exceeded, the support surface 42 and the counter-support surface 48 come to rest on each other. When wear increases further, this reciprocal support causes the screw bolt 32, which is to be moved together with the pressure plate 16 toward the flywheel, to be tilted back in a movement direction B2 opposite to the movement caused by the wear readjustment device 24.

If the clutch is then disengaged and the pressure plate 16, together with the screw bolt 32, is moved away from the flywheel, then the pressure action caused by the contact between the support surface 42 and the counter contact surface 48 is also eliminated, i.e., these surfaces are moved out of contact with each other, so that the screw bolt 32 is again moved or pressed in direction B1 by the prestress effect of the wear readjustment device 24.

Each movement or pressure process in direction B1 or direction B2 causes a relative movement to occur between the interengaged threaded surfaces of the thread 34 of the screw bolt 32, on the one hand, and the internal thread 38 of the opening 36, on the other. As described above, the transition of the two threaded surfaces to a slide friction state also leads to a significantly reduced coefficient of friction, namely, the slide friction coefficient, for the rotational movement of the screw bolt 32 in the opening 36, so that here, too, the phenomenon of self-loosening, generally known in screw connections, occurs. In other words, the successive back-and-forth tiltings that result from the tilting action of the wear detection element 44, on the one hand, and the wear readjustment device 24, on the other, produce a gradual outward rotational movement of the screw bolt 32 from the opening 36, which the wear readjustment device 24 can follow with an axial lengthening upon each disengagement process and accompanying release of the wear readjustment device 24 by the diaphragm spring 18. That is, each pressure process in direction B1 permits a slight axial lengthening of the wear readjustment device 24 due to the corresponding slight rotation of the two readjustment rings 26, 28 relative to each other. Thus, a gradual wear compensation is brought about, whereby the axial movement of the support surface 42, which interacts with the wear readjustment device 24, is produced by means of the "self-loosening" of the screw bolt 32.

As an alternative to the bolt element 44, a section can be provided on the diaphragm spring 18 that performs the function of the bolt element 44 and grips behind the head 40.

Figure 2:
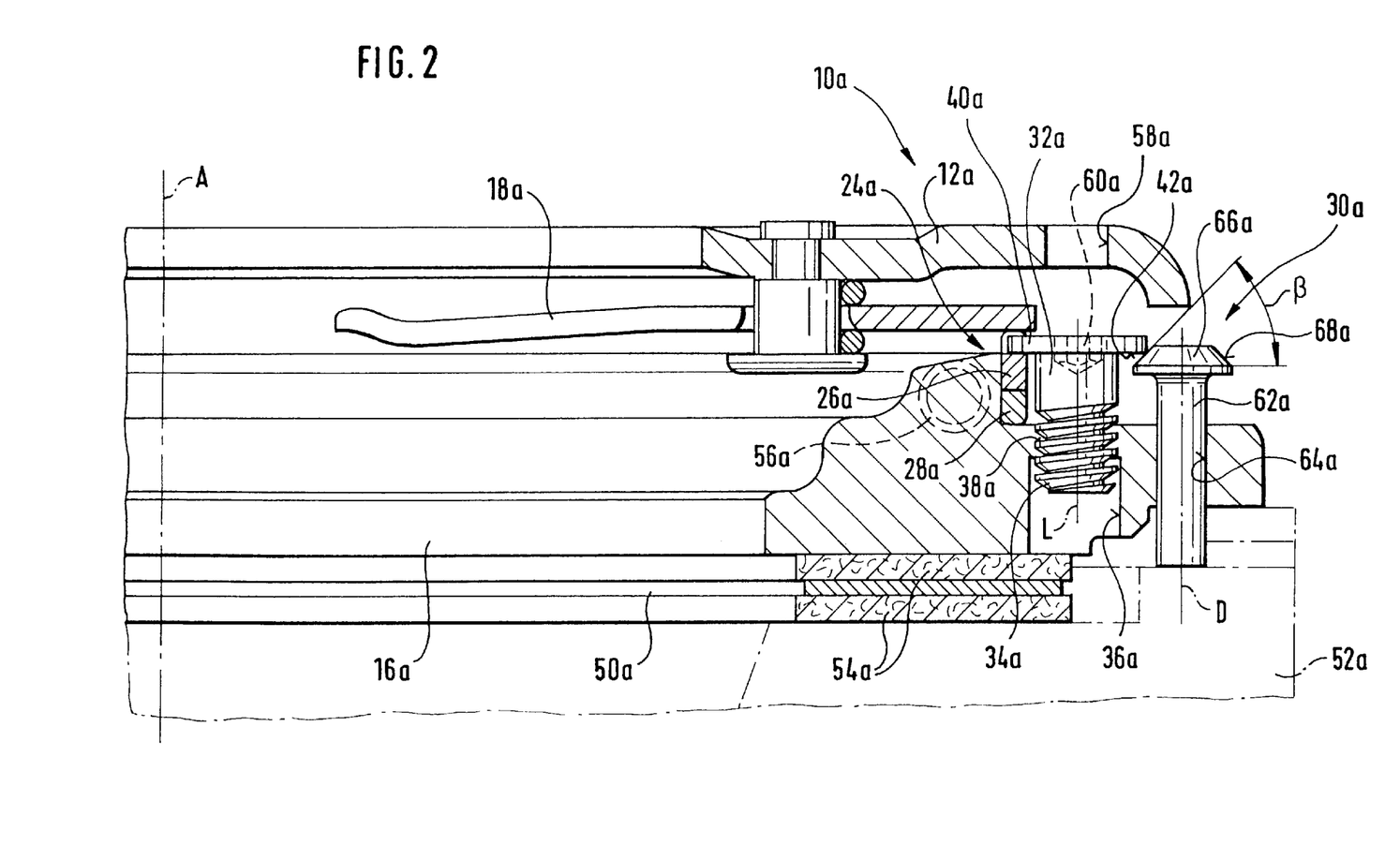
FIG. 2 is a view, corresponding to FIG. 1, of an alternative embodiment of the pressure plate component group according to the invention.

FIG. 2 shows an alternative embodiment of the pressure plate component group according to the invention. Components that correspond to those described in reference to FIG. 1 are identified by the same reference numbers with an "a" added. Basically, the constructive differences from the embodiment in FIG. 1 are discussed in what follows. First of all, FIG. 2 also shows the clutch disk 50a (not visible in FIG. 1), which, in the engaged state, is clamped with its friction linings 54a between the pressure plate 16a and the flywheel 52a. Further, FIG. 2 shows, in schematic fashion, the screw tension spring(s) 56a that act between the readjustment rings 26a, 28a.

FIG. 2 also shows that the thread 34a on the screw bolt 32a, as well as the internal thread 38a in the opening 36a, is embodied with a saw-toothed profile. The threads or threaded surfaces on the screw bolt 32 are thereby embodied so that surface regions located orthogonally relative to the bolt longitudinal axis L and pointing in the screw-out direction are provided, as are slanted surface regions lying in the opposite direction. It has been shown that an especially strong self-loosening effect can be obtained with such an embodiment of the threads 34a, 38a.

FIG. 2 also shows that the housing has a through opening 58a, through which a tool, e.g., an Inbus tool, can act on the screw bolt 32a, which has a complementary tool contact formation 60a. This allows manual wear compensation to be implemented by screwing out the screw bolt 32a, for example, and a basic setting of the screw bolt 32a to be established before the clutch is put into operation.

FIG. 2 shows a wear detection element in the form of a displacement pin 62a, which penetrates a through-opening 64a in the pressure plate 16a and extends in the direction of the flywheel 52a. The displacement pin 62a is substantially freely movable in the through opening 64a. The displacement pin 62a has a head 66a, which is embodied substantially as a truncated cone with a slanted surface 68a. The angle of slant β of the conical surface 68a relative to a plane that runs orthogonally to a pin longitudinal axis D is preferably in the area of 45°. The conical surface 68a again forms a support surface that can be brought to rest on the head 40a of the screw bolt 32a. Should wear occur during clutch operation, the pin 62a will strike the flywheel 52a and will thereby be moved upward, as illustrated in FIG. 2, toward the housing 12a. The pin 62a thereby comes to rest with its surface 68a on the head 40a or the contact surface 42a and, as in the previous embodiment, moves the screw bolt 32a, with its head, to the left, counter to the prestress effect of the wear readjustment device 24a, as shown in FIG. 2. During a subsequent disengagement process, the pressure plate 16a again moves away from the flywheel 52a, so that the thrust exerted on the pin 62a by the flywheel 52a is eliminated, i.e., the movement or pressure action of the pin 62a no longer exists. In this state, the wear readjustment device 24a is no longer pressurized by the diaphragm spring 18a. As a result, the reciprocally prestressed readjustment rings 26a, 28a can rotate relative to each other by a slight amount, and can thereby slightly lengthen the total axial extension of the wear readjustment device 24a, so that the screw bolt 32a in FIG. 2 is again tilted with its head 40a to the right. When the tilting movements occur, a slide friction state is again established between the threads 34a, 38a, with a corresponding reduction in the coefficient of friction for rotational movement. This results, again, in the aforementioned self-loosening or rotation of the screw bolt 32a, so that the latter is screwed slightly out of the opening 36a.

The angle of slant β provides the advantage that an axial movement of the pin 62a produces a radially directed thrust force component for the screw bolt 32a. Moreover, the successive wear compensation process described above takes place.

It should be pointed out that, as in the previous embodiment, the pressure action of the wear detection element, i.e., the bolt 44 or the pin 66a, does not exist when no wear has occurred during clutch operation. Thus, the screw bolt 32 or 32a, in both the engaged and the disengaged state, is always pressed in the first movement direction B1 by the prestress effect of the wear readjustment device 24a. Therefore, no relative movement occurs between the external thread of the screw bolt and the internal thread in the opening. Accordingly, there is no relative rotational movement between the screw bolt and the pressure plate, and thus no movement of the screw bolt away from the flywheel.

Figure 3:
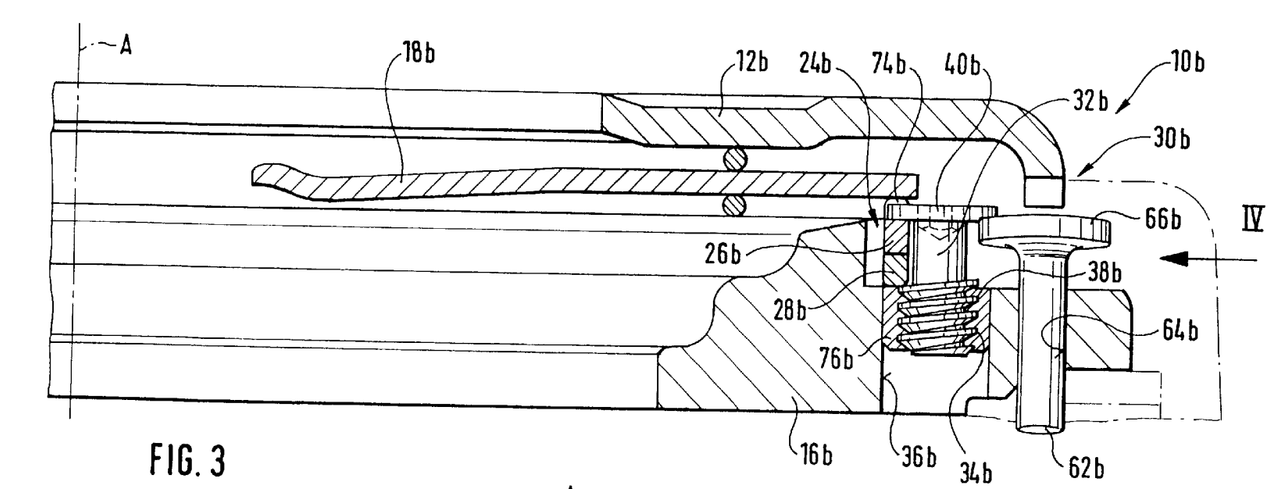
FIG. 3 is a view, corresponding to FIG. 1, of a further alternative embodiment of the pressure plate component group according to the invention.
Figure 4:
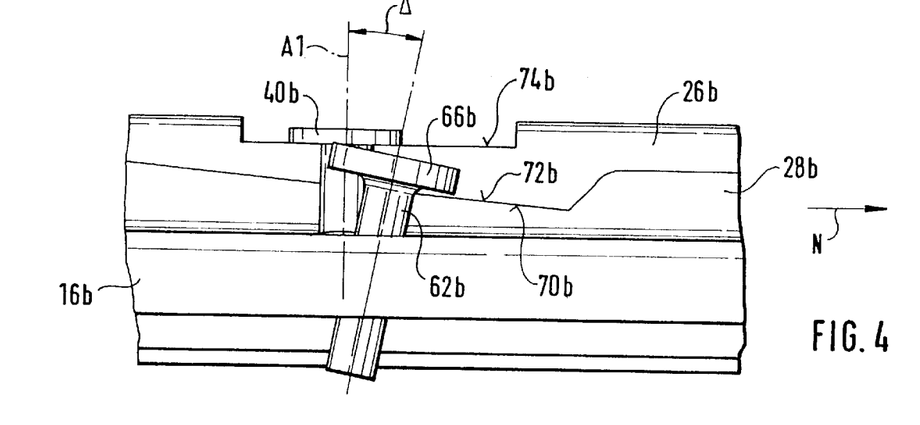
FIG. 4 is a view of the pressure plate component group in FIG. 3 seen in direction IV.

FIGS. 3 and 4 show a further embodiment of the pressure plate component group according to the invention. Components corresponding to components described above in reference to FIG. 1 or 2 are identified by the same reference numbers with a "b" added.

FIG. 4 shows the embodiment of the readjustment rings 26b, 28b with the respective slanted surfaces 70b, 72b. With the above-described wear compensation, wherein the two readjustment rings 26b, 28b can rotate relative to each other, the slanted surface 70b of the readjustment ring 26b and the slanted surface 72b of the readjustment ring 28b move relative to each other. Specifically, the embodiment is such that only the readjustment ring 28b is rotatable, for example, in a direction N, for the purpose of wear readjustment, while the readjustment ring 26 is held in a rotation-proof fashion. This rotation-proof arrangement can be achieved, for example, by the engagement of the bolt head 40b into a recess 74b of the readjustment ring 26b. However, any other means to secure the readjustment ring 26b against rotation, for example, by interaction with the diaphragm spring 18b, are also possible.

It is also possible for the wear compensation device to consist only of a single readjustment ring. In this case, the complementary slanted surfaces are embodied on the readjustment ring, on the one hand, and the pressure plate or diaphragm spring, on the other.

The embodiment in FIGS. 3 and 4 corresponds substantially to that in FIG. 2. However, as the drawings show, the pin 62b no longer extends parallel to the rotational axis A, but rather runs in a winding manner relative thereto. This means that the pin 62b, seen from the radial outside, is tilted in the circumferential direction, relative to a line A1 that is parallel to the rotational axis A, at a tilting angle Δ in the range from 10° to 20°, preferably in the area of 15°. Because of this tilting angle Δ, the screw bolt 32b, upon the occurrence of wear and the movement of the pin 62b, is tilted back toward the left, as shown in FIG. 3. Furthermore, a rotational movement component is applied to the screw bolt 32b, because the movement direction of the pin 62b inclined relative to the longitudinal axis of the screw bolt 32b also gives the screw bolt 32b a movement component in the circumferential direction. The screwing-out of the screw bolt 32b produced by the self-loosening effect is therefore promoted.

As FIG. 3 also shows, the screw bolt 32b can be arranged in a nut element 76b, which has the internal thread 38b and is placed securely into the opening 36b of the pressure plate 16. Otherwise, the embodiment in FIGS. 3 and 4 corresponds in function to the above-described embodiments.

Figure 5:
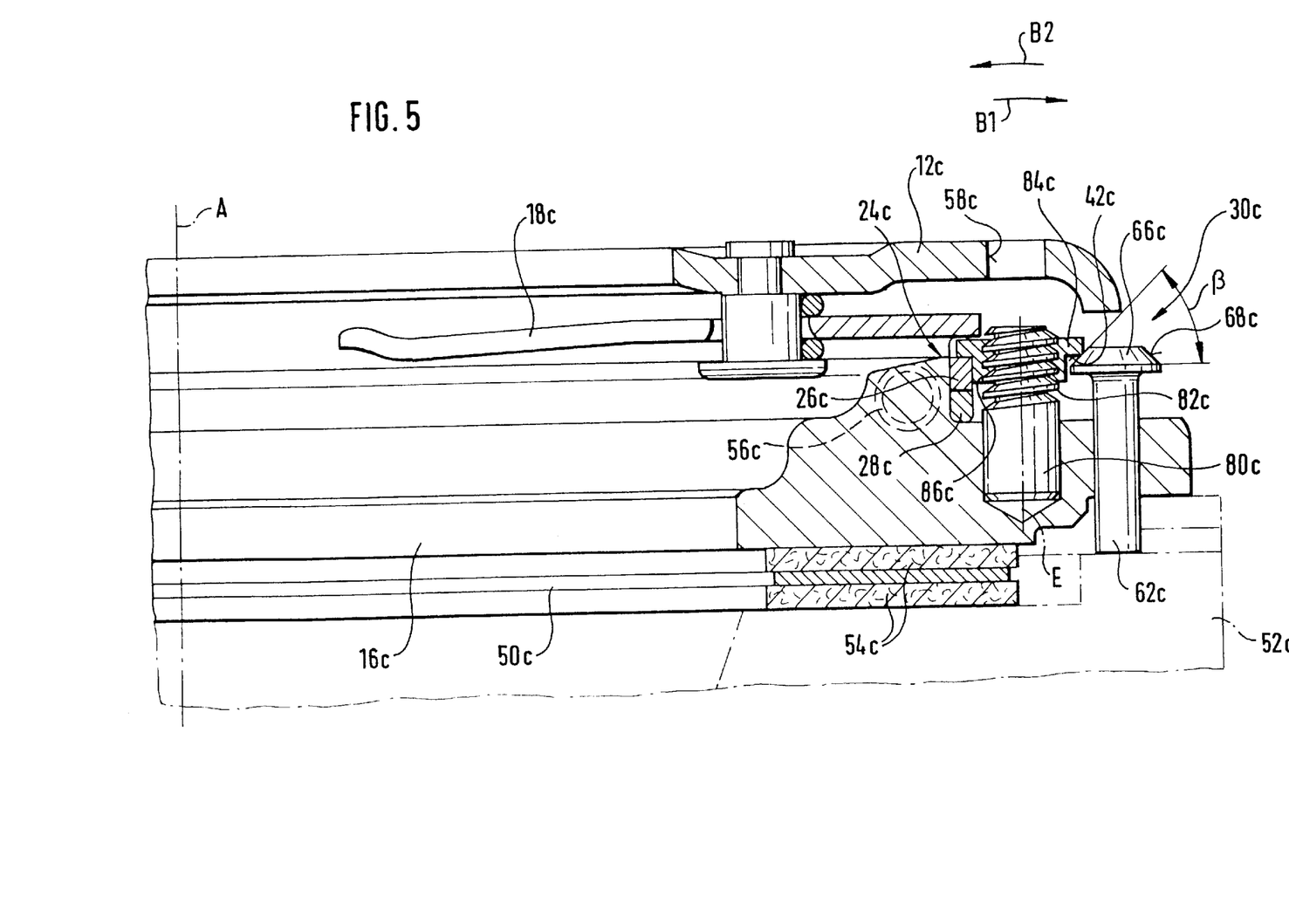
FIG. 5 is a view, corresponding to FIG. 1, of a further alternative embodiment of the pressure plate component group according to the invention.

FIG. 5 shows a further alternative embodiment of the pressure plate component group according to the invention. Components that correspond to components described above with respect to function or structure are identified by the same reference numbers with a "c" added.

In the embodiment in FIG. 5, a threaded bolt 80c is attached to the pressure plate 16 as the carrier element. The threaded bolt 80c preferably extends with its longitudinal axis E parallel to the rotational axis A. On its section projecting over the pressure plate 16c, the threaded bolt 80c carries an external thread 82c. A nut element 84c with a complementary internal thread 86c is screwed to this external thread 82c as a clearance indicator element. As in the embodiment in FIG. 2, the threads 82c and 86c are again embodied with a saw-toothed profile. Thus, the internal thread 86c of the nut element 84c has threaded surfaces that lie approximately orthogonally relative to the bolt longitudinal axis E and point away from the flywheel 52c, as well as slanted surface regions associated with these threaded surfaces and pointing toward the flywheel 52c. As described above, the threads 82c, 86c are again adjusted to each other so that the nut element 84c can tilt relative to the threaded bolt 80c or its longitudinal axis to a predetermined angular extent, which, for example, again corresponds to the angle α as in FIG. 1.

The wear compensation or readjustment procedure is then the same as described above. That is, in a wear-free engaged state, the nut element 84c is initially tilted in the first movement direction B1 by the wear readjustment device 24c, i.e., by the rotational prestress of the readjustment rings 26c, 28c. Should wear then occur, the pin 62c will again strike the flywheel 52c and, with its conical surface 68c, will move the nut element 84c in a direction B2, i.e., will tilt the nut element 84c back again. Given this alternating back-and-forth tilting and the relative movement that thereby occurs (and differs from a relative rotational movement) between the nut element 84c and the threaded bolt 80c, the above-described self-loosening of the nut element 84c again takes place, so that the latter—thanks also to prestress by the wear readjustment device 24c—moves successively away from the flywheel 52c and thereby permits a corresponding successive axial expansion of the wear readjustment device 24c, which acts on the contact surface 42c.

Figure 6:
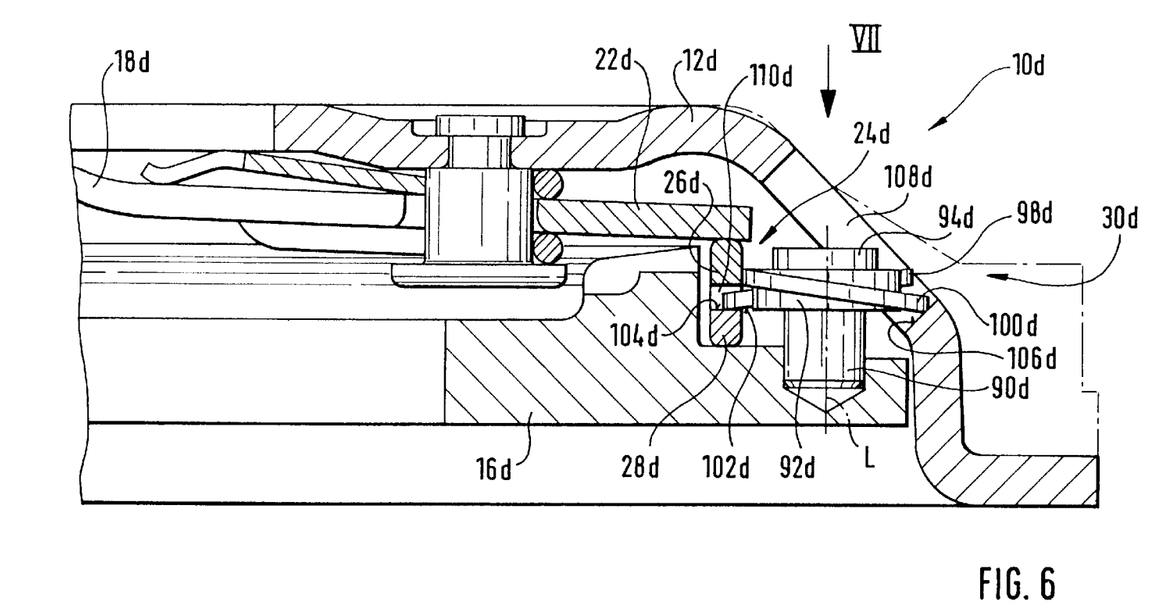
FIG. 6 is a view, corresponding to FIG. 1, of another alternative embodiment of the pressure plate component group according to the invention.
Figure 7:
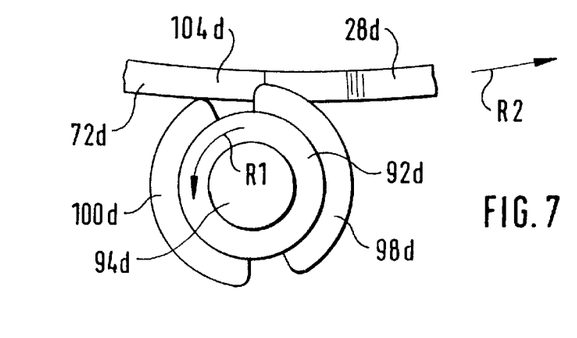
FIG. 7 is a top view of the clearance indicator element of the pressure plate component group in FIG. 6 seen in direction VII.

A further embodiment of the pressure plate component group according to the invention is shown in FIGS. 6 and 7. Components that correspond to components previously described are identified by the same reference numbers with a "d" added.

In the embodiments in FIGS. 6 and 7, a carrier bolt 90d, on which a ring-like clearance indicator element 92d is held in a rotation-proof manner, is again attached to the pressure plate 16d. The ring-like clearance indicator element 92d has a through opening, in which the carrier bolt 90d is held with movement clearance. That is, the ring-like clearance indicator element 92d is supported on the carrier bolt 90d so as to be rotatable around the bolt longitudinal axis L and also tiltable relative to this axis. The ring-like clearance indicator element 92d is prevented from falling off the carrier bolt 90d by a bolt head 94d. As shown, in particular, in FIG. 7, the ring-like clearance indicator element 92d has two helical external threaded segments or thread flank segments 98d, 100d, which are offset relative to each other by an angle of approximately 180°. The external threaded segment 98d thereby lies, in the region of its axial surface 102d, on a complementary counter-surface 104d of the readjustment ring 28d. In particular, one of the slanted surfaces 72d of the readjustment ring 28d is embodied in the area of the counter-surface 104d, as also shown in FIG. 4. The helical external threaded segment 100d lies on a counter-surface 106d, which is embodied in an opening 108d of the housing 12d so as to be directed substantially away from the flywheel.

In the area of the counter-surface 104d, for example, on the readjustment ring 26d, a recess 110d can be provided, which permits the entry of the helical external threaded segment 102d into the radial area of the wear readjustment device 24d.

What follows describes the function of the embodiment shown in FIGS. 6 and 7. Initially, it should be assumed that, in a disengaged and wear-free state, due to the prestress of the two readjustment rings 26d, 28d relative to each other, the readjustment ring 26d has tilted the ring-like clearance indicator element 92d (FIG. 6) in the clockwise direction via the slanted surface 72d and the external threaded segment. Upon a subsequent engagement procedure, during which the pressure plate 16d is moved toward the flywheel, the external threaded segment 100d does not yet come to rest on the counter-surface 106d. Should wear occur, leading the pressure plate 16d to move toward the flywheel, i.e., downward in FIG. 6, the external threaded segment 100d will strike the counter-surface 106d. This results, upon continued movement of the pressure plate 16d toward the flywheel, in the ring-like clearance indicator element 92d being tilted in the counterclockwise direction, as shown in FIG. 6. During this back-and-forth movement, which occurs upon every disengagement and engagement procedure, as described above, a relative movement occurs between the external threaded segment 102d and the counter-surface 104d, on the one hand, and the external threaded segment 100d and the counter-surface 106d, on the other. This relative movement, and the reduction in friction force thereby produced by the transition from the adhesive friction state to the slide friction state, permits the described rotation of the ring-like clearance indicator element 92d to occur in the rotational direction R1 in FIG. 7. In other words, rotation in the sense of self-loosening again takes place.

Because of the rotation of the clearance indicator element 92d in the rotational direction R1, successive areas of the external thread segment 98d come into position relative to the counter-surface 104d on the ring element 28d that is farther from an axially opposed surface region of the pressure plate 16d, on which region the readjustment ring 28d rests. This again permits the readjustment ring 28d to move in the rotational direction R2 in FIG. 7, until the somewhat enlarged axial distance between the corresponding region of the axial surface 102d and the pressure plate 16 is compensated for by the slanted surface 72d. That is, each slight rotation of the ring-like clearance indicator element 92d around the axis L permits a corresponding rotation of the readjustment ring 28d in the rotational direction R and a corresponding axial expansion of the wear readjustment device 24d.

In the embodiment in FIGS. 6 and 7, the helical external threaded segments 98d, 100d thus form, with their respective surfaces or edges, the thread-type surface areas of the clearance indicator element, which then rest on and are movable relative to the respective counter-surfaces that are embodied on the readjustment ring 28d, on the one hand, and on the housing 12d, on the other. In the embodiment in FIGS. 6 and 7, the tilting movement is thus induced by the fact that different sections of the counter-surface formation (which consists of the counter-surfaces 104d, 106d) are moved relative to each other in the axial direction and thereby take along various sections of the clearance indicator element 92d.

It should be pointed out that, instead of providing the individual ring segments, it is also possible to provide a continuous helical projection area, i.e., a continuous threaded projection on the ring-like clearance indicator element 92d.

It is understood that in all of the above embodiments, the term "thread-type surface formation" is not meant to indicate a defined extended surface area; rather, edge or border sections of individual threaded projections or slanted surface projections can also make up this surface formation. The term "thread-type surface formation" is therefore to be understood as meaning that, on a circumferential surface, a surface, edge or border region area extending in helical or slanting fashion relative to a defined longitudinal axis is provided that comes to rest on a given counter-surface.

Instead of providing a tilting possibility between the clearance indicator element, on the one hand, and the respective associated carrier component, on the other, in principle the elastically deformable embodiment of one of the components would also be conceivable. For example, in FIG. 6, at least one central body section of the ring-like clearance indicator element 92d can consist of elastically deformable plastic or the like, so that, due to the alternating thrust action of the counter-surfaces 104d, 106d, an alternating deformation occurs in one direction and then the other, without the entire clearance indicator element 92d thereby being tilted.

The invention is not limited by the embodiments described above which are presented as examples only but can be modified in various ways within the scope of protection defined by the appended patent claims.

We claim:

1. A pressure plate component group for a motor vehicle friction clutch with automatic wear compensation having a clutch disk with friction linings, comprising:

a housing attachable to a flywheel for common rotation around a rotational axis;

a pressure plate arranged in the housing in a rotation-proof manner and so as to be axially movable relative to the housing;

an energy storage device supported between the housing and the pressure plate so as to press the pressure plate in a direction of a side of the housing provided for connection to the flywheel;

a wear readjustment device arranged in a support path of the energy storage device and having at least one readjustment element which is prestressed and movable for wear adjustment purposes;

at least one clearance indicator arrangement operatively arranged to interact with the wear readjustment device so as to permit compensation for wear that occurs, during clutch operation, on the friction linings of the clutch disk which are clampable between the pressure plate and the flywheel;

a carrier component; and a counter-surface formation, the at least one clearance indicator arrangement including:

a clearance indicator element supported on the carrier component so as to be rotatable around an element rotational axis, the clearance indicator element having a wear adjustment area for interaction with the wear readjustment device and a thread-type surface formation on a circumferential surface which, at least regionally, engages with the counter-surface formation, the clearance indicator element being movable relative to the counter-surface formation so that a relative movement can be produced between the thread-type surface formation and the counter-surface formation that differs from a relative rotational movement between the thread-type surface formation and the counter-surface formation that is produced by rotation of the clearance indicator element around the element rotational axis; and movement means for producing the relative movement between the thread-type surface formation and the counter-surface formation.

2. A pressure plate component group as defined in claim 1, wherein the wear adjustment device is arranged to press the clearance indicator element in a first movement direction.

3. A pressure plate component group as defined in claim 2, wherein the movement means are configured so as to move the clearance indicator element in a second movement direction substantially opposite to the first movement direction.

4. A pressure plate component group as defined in claim 3, wherein the wear readjustment device is operatively arranged so as to one of move and press the clearance indicator element in the first movement direction, in an approximately wear-free state of the friction linings, the movement means being operative to one of move and press the clearance indicator element in the second movement direction upon one of occurrence and detection of wear, the movement means being further operative to at least partially eliminate the one of moving and pressing of the clearance indicator element in the second movement direction, and the wear readjustment device being operative to one of move and press the clearance indicator element in the first movement direction, upon a subsequent disengagement procedure, the movement means further one of moving and pressing the clearance indicator element in the second movement direction upon a subsequent engagement procedure whereby the alternating movement of the clearance indicator element with a corresponding relative movement between the thread-type surface formation and the counter-surface formation leads to a relative rotation between the thread-type surface formation and the counter-surface formation, and a wear compensation expansion of the wear readjustment device in the direction of the rotational axis in keeping with an amount of the relative rotation is possible.

5. A pressure plate component group as defined in claim 3, wherein the wear readjustment device has a contact projection embodied on the clearance indicator element so as to extend substantially radially outward and at least partially in the circumferential direction, whereby the wear readjustment device acts on the contact projection to move the clearance indicator element in the first movement direction, and whereby the movement means acts on the contact projection to move the clearance indicator element in the second movement direction.

6. A pressure plate component group as defined in claim 5, wherein the movement means includes a wear detection element configured and arranged so that, when wear occurs, the wear detection element is movable relative to the contact projection.

7. A pressure plate component group as defined in claim 6, wherein the wear detection element comprises a wear detection pin movably mounted on the pressure plate, the wear detection pin being contactable, for wear detection purposes with one of the flywheel and another component of the pressure plate component group, whereby when wear occurs, the wear detection pin rests, with a tilting section, on the contact projection of the clearance indicator element.

8. A pressure plate component group as defined in claim 6, wherein the wear detection element comprises a wear detection part attached to one of the housing and the energy storage device so that when wear occurs, the wear detection part rests, with a movement section on the contact projection of the clearance indicator element.

9. A pressure plate component group as defined in claim 1, wherein the clearance indicator element is supported on the carrier component so as to be tiltable relative to the element rotational axis to produce a relative movement, the movement means including tilting means.

10. A pressure plate component group as defined in claim 9, wherein the counter-surface formation is a threaded counter-surface formation provided on the carrier component, the thread-type surface formation and the threaded counter-surface formation being configured relative to each other so as to define a tilting movement clearance relative to each other in order to permit tilting.

11. A pressure plate component group as defined in claim 9, wherein the clearance indicator element is embodied in a ring-like manner with a through-opening, the carrier component being a carrier bolt that penetrates the through-opening of the clearance indicator element with a movement clearance so as to permit tilting, and is attached to the pressure plate, thread-type surface formation being on a radially outer region of the clearance indicator element and comprises at least one helical projection section that extends, at least regionally, in the circumferential direction and helically relative to the element rotational axis, whereby the helical projection section has a wear readjustment area, the tilting means acting on the helical projection section.

12. A pressure plate component group as defined in claim 11, wherein the wear readjustment device is arranged so that it can be brought to rest on the helical projection section, an area of the counter-surface formation being embodied on the wear readjustment device.

13. A pressure plate component group as defined in claim 12, wherein the tilting means has a further area of the counter-surface formation.

14. A pressure plate component group as defined in claim 11, wherein the tilting means is a contact surface region provided on the housing.

15. A pressure plate component group as defined in claim 11, wherein the thread-type surface formation comprises a first helical projection section for interaction with the wear readjustment device and a second helical projection section for interaction with the tilting means.

16. A pressure plate component group as defined in claim 1, wherein the carrier component is stationary relative to the pressure plate.

17. A pressure plate component group as defined in claim 1, wherein the pressure plate forms the carrier component and has a threaded opening with an internal thread that forms the counter-surface formation, the clearance indicator element being a bolt having at least in one longitudinal area an external thread that forms the thread-type surface formation.

18. A pressure plate component group as defined in claim 1, wherein the carrier component is a carrier bolt that is attached to the pressure plate and has an external threaded area that forms the counter-surface formation, the clearance indicator element having a ring-like shape with an internal thread that forms the thread-type surface formation.

19. A pressure plate component group as defined in claim 1, wherein the thread-type surface formation has a substantially saw-toothed profile, and the counter-surface formation has a threaded counter-surface formation with a complementary saw-toothed profile.

20. A pressure plate component group as defined in claim 1, wherein the thread-type surface formation and the counter-surface formation are configured so that the relative rotational movement between the thread-type surface formation and the counter-surface formation cause an axial movement of the clearance indicator element together with the wear readjustment area that interacts with the wear readjustment device.

21. A pressure plate component group as defined in claim 1, wherein the clearance indicator element is held in an axially immovable fashion relative to the carrier component and is configured so that, upon relative rotation between the thread-type surface formation and the counter-surface formation, successive areas of the thread-type surface formation interact with the wear readjustment device and permit an axial expansion of the wear readjustment device to compensate for wear that has occurred.

22. A pressure plate component group as defined in claim 1, wherein the energy storage device is a diaphragm spring.

* * * * *